US008327160B2

(12) United States Patent
Sakamoto et al.

(10) Patent No.: US 8,327,160 B2
(45) Date of Patent: Dec. 4, 2012

(54) REMOTE CONTROLLER, ELECTRICAL APPARATUS AND WIRELESS CONTROLLING SYSTEM FOR CONTROLLING THE ELECTRICAL APPARATUS TO TURN ON AT A STARTUP TIME

(75) Inventors: Takafumi Sakamoto, Tokyo (JP); Toshiyuki Nakanishi, Kanagawa-ken (JP); Makoto Tsuruta, Kanagawa-ken (JP); Keisuke Mera, Kanagawa-ken (JP); Toshiyuki Umeda, Tokyo (JP); Shoji Otaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 571 days.

(21) Appl. No.: 12/501,650

(22) Filed: Jul. 13, 2009

(65) Prior Publication Data

US 2010/0037082 A1 Feb. 11, 2010

(30) Foreign Application Priority Data

Aug. 11, 2008 (JP) ................................ 2008-206980

(51) Int. Cl.
*G06F 1/00* (2006.01)
*H04N 5/76* (2006.01)

(52) U.S. Cl. ......................... 713/300; 306/291; 306/299

(58) Field of Classification Search .................. 713/300; 386/291, 299
See application file for complete search history.

(56) References Cited

U.S. PATENT DOCUMENTS

| | | | | |
|---|---|---|---|---|
| 5,627,540 | A * | 5/1997 | Deguchi et al. | 341/176 |
| 5,898,398 | A * | 4/1999 | Kumai | 341/176 |
| 6,771,182 | B1 * | 8/2004 | Loh et al. | 340/12.28 |
| 6,795,130 | B2 * | 9/2004 | Shibamiya | 348/734 |
| 7,516,203 | B2 * | 4/2009 | Watanabe et al. | 709/223 |
| 2007/0200659 | A1 * | 8/2007 | Kim | 340/3.71 |

(Continued)

FOREIGN PATENT DOCUMENTS

JP 5-41286 6/1993

(Continued)

OTHER PUBLICATIONS

U.S. Appl. No. 12/364,109, filed Feb. 2, 2009, Toshiyuki Nakanishi, et al.

U.S. Appl. No. 12/364,061, filed Feb. 2, 2009, Takafumi Sakamoto, et al.

Japanese Office Action regarding JP 2008-206980, dated Jun. 19, 2012 (with English Translation).

*Primary Examiner* — Ji H Bae

(74) *Attorney, Agent, or Firm* — Oblon, Spivak, McClelland, Maier & Neustadt, L.L.P.

(57) ABSTRACT

In a remote controller, a startup time or a first time duration until the startup time is input into an input unit. A timer unit counts a clock time or a second time duration. A control unit generates a signal to turn on an electrical apparatus when the second time duration reaches the first time duration, or when the clock time equals to the startup time. A transmitting unit transmits the signal. In the electrical apparatus, a main unit operates main function. A transformer supplies electricity from an external power source to the main unit through a switch. A rectifier rectifies the signal. A signal identifying unit identifies it. A reservation memory unit keeps parameter for main function. A control unit turns on the switch and controls the main unit according to the parameter when the signal is received. A battery supplies electricity to above units.

15 Claims, 13 Drawing Sheets

U.S. PATENT DOCUMENTS

| | | | | |
|---|---|---|---|---|
| 2008/0088748 | A1* | 4/2008 | Lim | 348/734 |
| 2008/0100491 | A1 | 5/2008 | Umeda et al. | |
| 2009/0051503 | A1* | 2/2009 | Bowman et al. | 340/309.4 |
| 2009/0132836 | A1 | 5/2009 | Mera et al. | |
| 2009/0256966 | A1* | 10/2009 | Hirota | 348/564 |

FOREIGN PATENT DOCUMENTS

| | | |
|---|---|---|
| JP | 6-33507 | 12/1994 |
| JP | 2006-319863 | 11/2006 |

* cited by examiner

REMOTE CONTROLLER, ELECTRICAL APPARATUS AND WIRELESS CONTROLLING SYSTEM FOR CONTROLLING THE ELECTRICAL APPARATUS TO TURN ON AT A STARTUP TIME

CROSS-REFERENCE TO RELATED APPLICATIONS

This application is based upon and claims the benefit of priority from the prior Japanese Patent Application No. 2008-206980, filed on Aug. 11, 2008, the entire contents of which are incorporated herein by reference.

BACKGROUND OF THE INVENTION

1. Field of the Invention

The present invention relates to a remote controller, electrical apparatus and wireless controlling system.

2. Description of the Related Art

In wireless controlling systems, an electrical apparatus is controlled by a remote controller using a wireless medium such as radio wave and infrared rays. One of the electrical apparatuses is disclosed in JP-A 2006-319863 (KOKAI). In this electrical apparatus, a rectifier is adopted in a receiving unit to control a switch. The switch is used to connect or unconnect an external power source and an internal circuit in order to supply electricity from the external power source to the internal circuit. When the receiving unit receives an electromagnetic wave from the remote controller, the rectifier generates electrical power. The switch is controlled based on the electrical power from the rectifier in the receiving unit. The electrical apparatus reduces a consumption of standby electricity during waiting for the electromagnetic wave from the remote controller by using a passive element such as the rectifier in the receiving unit.

However, it is difficult to apply the electrical apparatus to an electrical apparatus with a reservation function, such as a hard-disk recorder and an air-conditioner. This is because that the reservation function does not work if a user turns off the electrical apparatus automatically after making the reservation by using the remote controller.

For example, if the electrical apparatus is turned off from the remote controller after making a reservation for recording a program on the hard-disk recorder, the recording will not be performed because the electrical apparatus has already been turned off. For another example, the air-conditioner will not start to work at a reserved time because of the same reason as described above. This problem may be avoided by prohibiting turning off the electrical apparatus from the remote controller after making a reservation. However, the keeping the electrical apparatus turned on leads to increase the consumption of standby electricity.

SUMMARY OF THE INVENTION

According to one aspect of the invention, a remote controller for controlling an electrical apparatus to turn on at a startup time includes:

an input unit which the startup time or a first time duration until the startup time is input;

a timer unit which counts either a clock time or a second time duration;

a control unit which generates a first signal to turn on the electrical apparatus when the second time duration counted by the timer unit reaches the first time duration, or when the clock time counted by the timer unit equals to the startup time; and a transmitting unit which transmits the first signal to the electrical apparatus using a wireless medium.

According to other aspect of the invention, an electrical apparatus which is controlled by a reservation to turn on at a startup time made by a remote controller includes:

a main unit which operates a main function;

a transformer which transforms an electricity from an external power source into which is suitable to the main unit;

a first switch which supplies the electricity from the external power source to the transformer;

a rectifier which rectifies a first signal indicating anyone of startup, halt, or a parameter for operation of the main function, the first signal being transmitted from the remote controller using a first wireless medium;

a signal identifying unit which identifies the first signal;

a reservation memory unit which keeps the parameter for the reservation made by the remote controller;

a control unit which stores the parameter into the reservation memory unit when the first signal indicating the parameter is received, turns on the first switch and controls the main unit according to the parameter memorized in the reservation memory unit when the first signal indicating startup is received, and turns off the first switch when the first signal indicating halt is received; and a battery which supplies electricity to the rectifier, the signal identifying unit, the reservation memory unit, and the control unit.

DETAILED DESCRIPTION OF THE INVENTION

The embodiments will be explained with reference to the accompanying drawings.

Description of the First Embodiment

Figure 1:
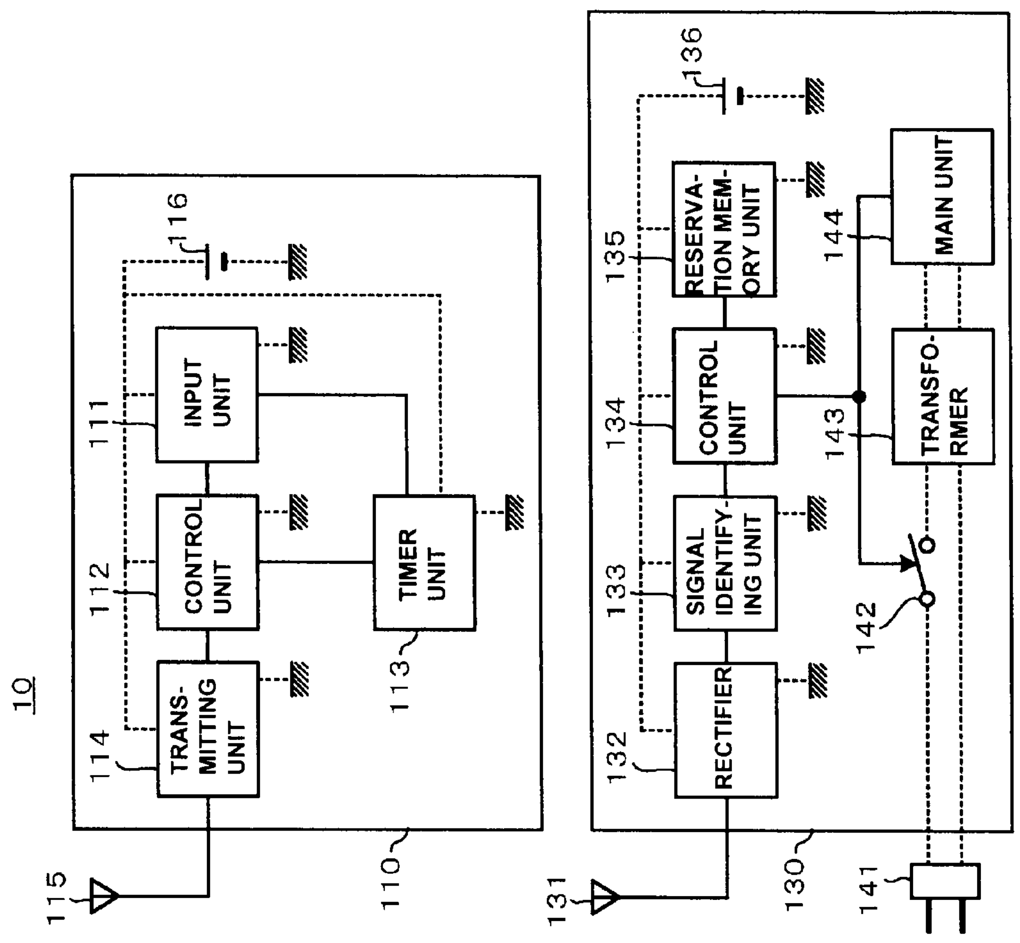
FIG. 1 is a block diagram showing a wireless controlling system 10 according to the first embodiment.

As shown in FIG. 1, a wireless controlling system 10 includes a remote controller 110 and an electrical apparatus 130. The electrical apparatus 130 is controlled by the remote controller 110 using a wireless medium. The electrical apparatus 130 may be an air-conditioner or a recorder such as a DVD recorder and a TV with an internal HDD. A user turns on/off the electrical apparatus 130 from the remote controller 110. Moreover, the user makes a reservation using the remote controller 110 to turn on/off the electrical apparatus 130 at a desired clock time. When the user tries to control the electrical apparatus 130 from the remote controller 110, the user inputs an instruction into the remote controller 110. The instruction from the user indicates startup ("ON"), or halt ("OFF"), or making a reservation to turn on/off. The remote controller 110 sends a control packet to the electrical apparatus 130 to control the electrical apparatus 130 according to the instruction from the user. There are three kinds of control packets which indicate startup ("ON"), halt ("OFF"), set of parameters for an operation of the electrical apparatus 130, respectively.

The remote controller 110 includes an input unit 111, a control unit 112, a timer unit 113, a transmitting unit 114, an antenna 115, and a battery 116. An instruction from a user is input into the input unit 111. When the user tries to make a reservation to turn on the electrical apparatus 130 at a desired clock time (hereinafter "startup time"), the instruction indicates making a reservation to turn on, with the startup time and other parameters for an operation of the electrical apparatus 130. For example, in the case of the air-conditioner, the parameters may be a temperature, a wind volume, and a direction of the wind. On the other hand, when the user tries to make a reservation to turn off the electrical apparatus 130 at a desired clock time, the instruction indicates making a reservation to turn off with the clock time to turn off. When the instruction indicates making a reservation to turn on, the time duration until startup is set to the timer unit 113 based on the startup time. The timer unit 113 counts a remaining time duration until the startup time.

The control unit 112 generates a control packet indicating startup ("ON"), when the instruction from the user indicates startup ("ON"). Similarly, the control unit 112 generates a control packet indicating halt ("OFF"), when the instruction from the user indicates halt ("OFF"). The control unit 112 also generates the control packet indicating halt ("OFF") when the instruction from the user indicates making a reservation to turn off and the timer unit 113 expires at the clock time to turn off. Moreover, the control unit 112 generates a control packet indicating a set of parameters for an operation when the instruction from the user indicates making a reservation to turn on. Then, the control unit 112 generates the control packet indicating startup ("ON"), when the timer unit 113 reaches the startup time.

The transmitting unit 114 transmits the control packet to the electrical apparatus 130, when the transmitting unit 114 is indicated to send by the control unit 112.

The control packet is transmitted from the antenna 115 as a radio wave. The battery 116 supplies electricity to the input unit 111, the control unit 112, the timer unit 113, and the transmitting unit 114.

The electrical apparatus 130 includes an antenna 131, a rectifier 132, a signal identifying unit 133, a control unit 134, a reservation memory unit 135, a battery 136, a power plug 141, a switch 142 for supplying electricity to a main unit 144 from an external power source (not shown), a transformer 143 for adapting a voltage from the power plug 141, and a main unit 144. The main unit 144 operates a main function of the electrical apparatus 130, for example, a cooling function in the case of the air-conditioner and a recording function in the case of the recorder such as a DVD recorder, a TV with an internal HDD.

The antenna 131 receives the control packet from the remote controller 110. The rectifier 132 rectifies the control packet. The details of the rectifier 132 will be described later. The signal identifying unit 133 identifies the control packet, which indicates startup ("ON") or halt ("OFF"), or parameters for the operation, based on an output from the rectifier 132.

The reservation memory unit 135 memorizes the parameters for the operation in the received control packet. The parameters memorized in the reservation memory unit 135 are used for the operation to be executed after startup of the electrical apparatus 130. The reservation memory unit 135 may memorize a procedure of the operation to be executed after startup in addition to the parameters. In this case, the control unit 134 transforms the parameters to the procedure for the operation.

The control unit 134 controls supplying electricity from the external power source (not shown) to the main unit 144 by turning on/off the switch 142 according to the received control packet indicating the startup ("ON") or halt ("OFF"). After turning on the switch 142 to supply electricity to the main unit 144, the control unit 134 controls the main unit 144 according to the parameters which are memorized in the reservation memory unit 135.

The battery 136 always supplies electricity to the rectifier 132, the signal identifying unit 133, the control unit 134, and the reservation memory unit 135. The battery 136 may be either of a primary battery such as a dry-cell battery, a button battery or a secondary battery such as a rechargeable battery, or a super capacitor. In the case of the secondary battery, the battery 136 works as a charging unit from the external power source (not shown).

The power plug 141 is connected to the external power source (not shown) to supply electricity to the transformer 143 and the main unit 144 through the switch 142. The transformer 143 adapts a voltage from the power plug 141 to be a voltage of the main unit 144.

(The Detail Description of the Rectifier 132)

The rectifier 132 rectifies an RF signal corresponding to the control packet received at the antenna 131 effectively and operates with low power consumption.

Figure 2:
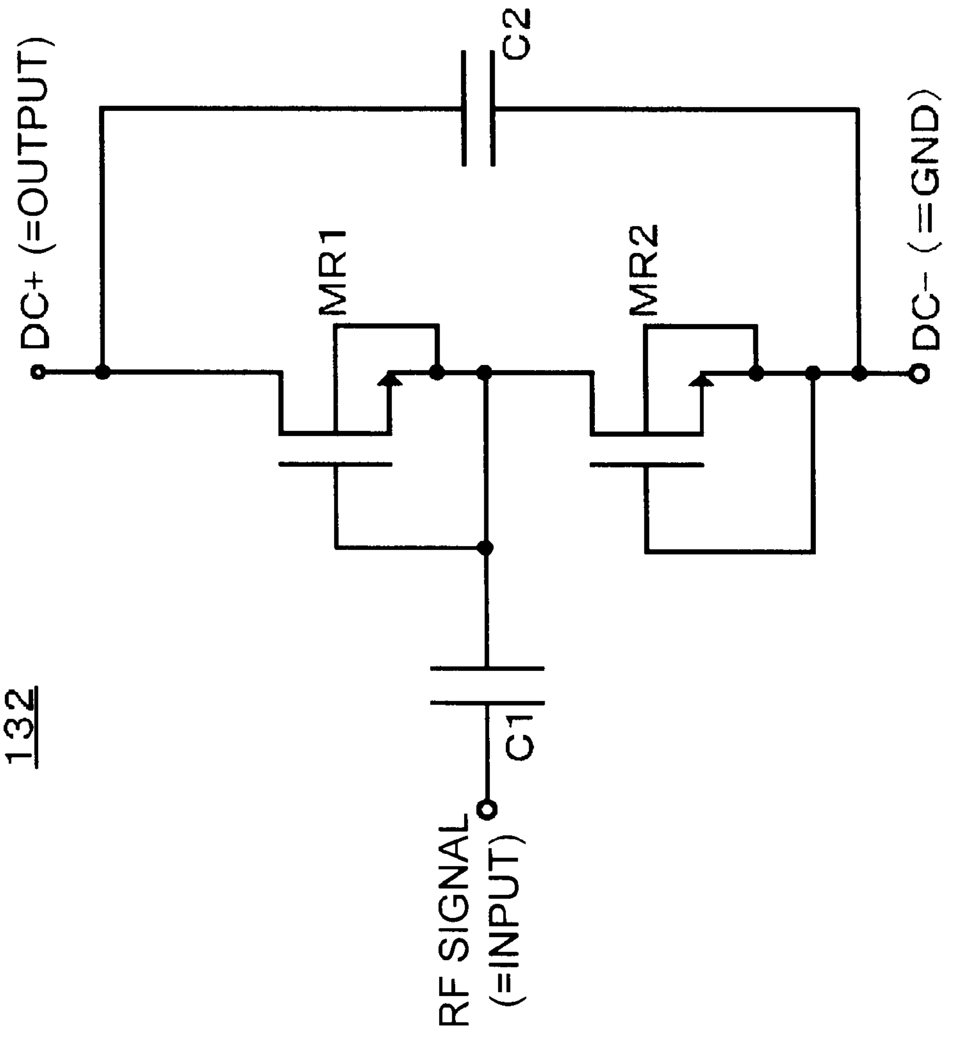
FIG. 2 is a block diagram showing an example of a rectifier.

As shown in FIG. 2, the rectifier 132 has serial-connected nMOS transistors MR1, MR2. A gate and a source of each transistor are connected to each other like a short-circuit. This means that the transistors MR1, MR2 are kinds of a diode-connected transistor. One terminal of a capacitor C1 is connected to a connection point of the transistors MR1 and MR2. The other terminal of the capacitor C1 is connected to the antenna 131 as an input terminal of the rectifier 132 and inputs the RF signal from the antenna 131. One terminal of a smoothing capacitor C2 is connected to a drain of the transistor MR1 and the other terminal of the smoothing capacitor C2 is connected to a source of the transistor MR2. An output voltage (rectified voltage) is generated by inserting the smoothing capacitor C2 between the drain of the transistor MR1 and the source of the transistor MR2.

Inputting the RF signal causes a flow of electricity with a half-wave through the transistor MR1, the smoothing capacitor C2, and the transistor MR2. As a result, the output voltage (rectified voltage) with a direct current is generated at both terminals of the smoothing capacitor C2. One terminal DC− of the rectifier 132 is connected to a ground. The other terminal DC+ is connected to the signal identifying unit 133 as an output terminal of the rectifier 132.

(Operation in the Wireless Controlling System 10)

Figure 3:
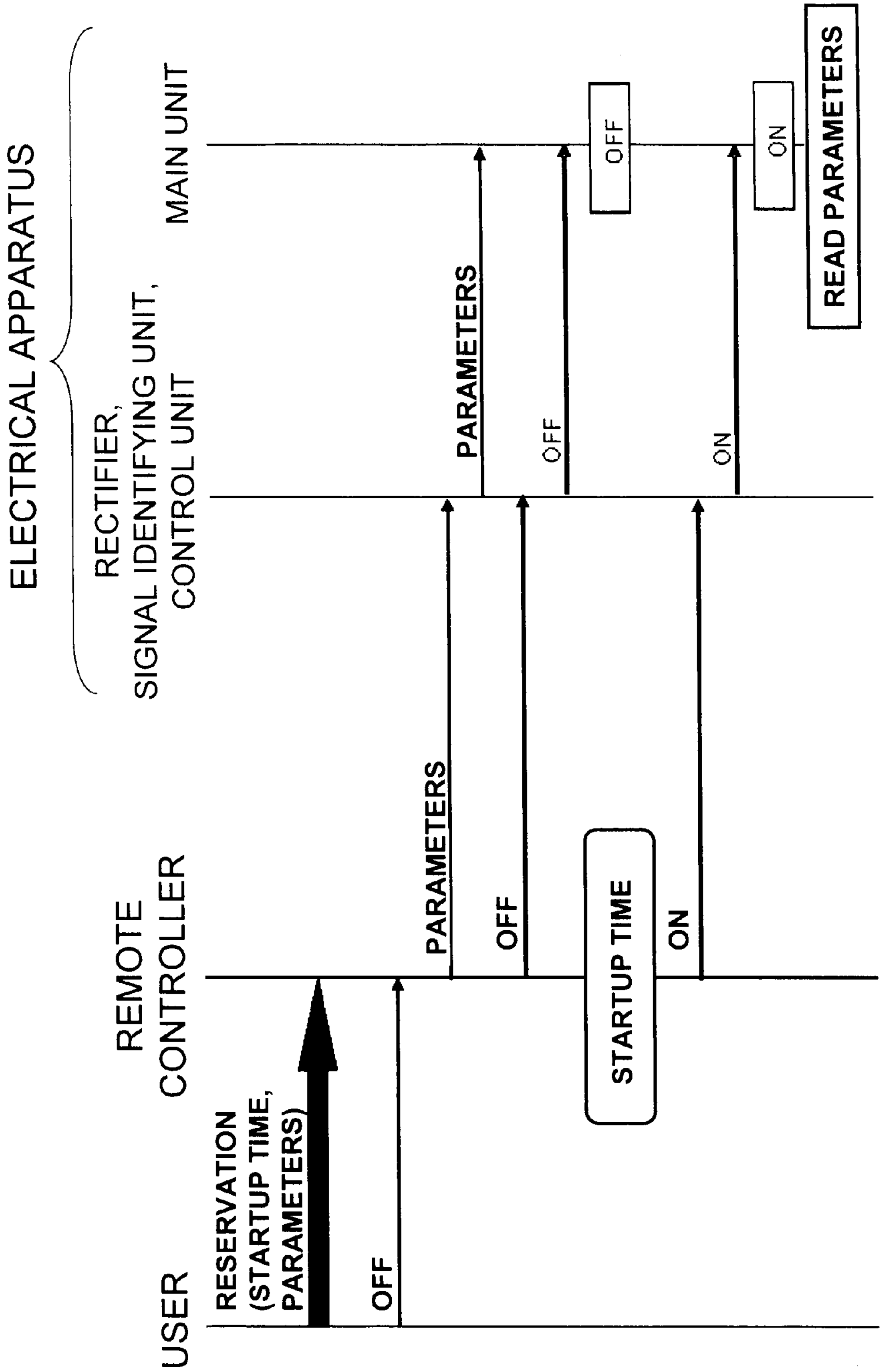
FIG. 3 is a sequence chart showing an example of an operation in the wireless controlling system 10.

Hereinafter, we explain an example of the operation in the wireless controlling system 10 with using FIG. 3. An example case is considered that a user makes a reservation to turn on the electrical apparatus 130 by using the remote controller 110. The electrical apparatus 130 may be the air-conditioner.

(1) Making a Reservation:

The user inputs an instruction indicating making the reservation to turn on, with a startup time and other parameters for an operation of the electrical apparatus 130 into the input unit 111. The parameters may be a temperature, a wind volume, and a direction of the wind. The remote controller 110 transmits a control packet indicating set of the parameters for an operation to the electrical apparatus 130. The electrical apparatus 130 receives the control packet and memorizes the parameters for the operation in the reservation memory unit 135.

Some users think making the reservation of startup has finished by inputting the instruction indicating making the reservation to turn on. Therefore, these users may try to turn off the electrical apparatus 130 automatically to save energy, and input another instruction indicating halt ("OFF") to turn off the electrical apparatus 130 immediately, for example, by pushing a power button (not shown) on the remote controller 110. When the instruction from the user indicates halt ("OFF"), the remote controller 110 transmits the control packet indicating halt ("OFF") to the electrical apparatus 130 to turn off the electrical apparatus 130 immediately.

The electrical apparatus 130 receives the control packet indicating halt ("OFF"). The control packet indicating halt ("OFF") is sent to the control unit 134 as an "OFF" signal through the rectifier 132 and the signal identifying unit 133. When the control unit 134 receives the "OFF" signal, it turns off the switch 142 to stop supplying electricity from the external power source (not shown) to the main unit 144. Therefore, the other units except the main unit 144, that is the rectifier 132, the signal identifying unit 133, the control unit 134, and the reservation memory unit 135 are kept on to wait for receiving the control packet indicating startup ("ON") from the remote controller 110. After turning off the electrical apparatus 130, the remote controller 110 manages the timer unit 113 to transmit the control packet so as to turn on the electrical apparatus 130 at the startup time.

(2) Managing the Timer 113 in the Remote Controller 110:

After turning off the electrical apparatus 130, the timer unit 113 in the remote controller 110 starts to count the time duration until startup of the electrical apparatus 130. When the timer unit 113 expires, the control unit 112 controls the transmitting unit 114 to transmit a control packet indicating startup ("ON").

The remote controller 110 just transmits only the control packet indicating startup ("ON"), since it has already transmitted the control packet indicating the parameters for an operation of the electrical apparatus 130. Since the electrical apparatus 130 has memorized the parameters used for the operation to be executed after startup in the reservation memory unit 135, the electrical apparatus 130 starts to operate without delay and errors due to transmission using the wireless medium.

(3) Startup the Electrical Apparatus 130:

After turning on the electrical apparatus 130, it executes operation based on the parameters memorized in the reservation memory unit 135.

According to the first embodiment, in the wireless controlling system 10, the electrical apparatus 130 can turn off the main unit 144 after making a reservation for startup, because the electrical apparatus 130 does not have a timer for startup and does not need to manage it, but the remote controller 110 has the timer unit 113 and manages the timer for setup. Therefore, the wireless controlling system 10 reduces the consumption of standby electricity compared with a wireless controlling system which the electrical apparatus 130 has the timer for startup.

Moreover, in generally, a transformer for an external power source causes a lot of loss of the electricity. In the wireless controlling system 10, the remote controller does not need to use the transformer, because the remote controller may be supplied electricity from either of a primary battery such as a dry-cell battery, a button battery or a secondary battery such as a rechargeable battery, or a super capacitor. Therefore, managing the timer for startup by the remote controller 110 does not cause increase of the consumption of standby electricity.

Figure 4:
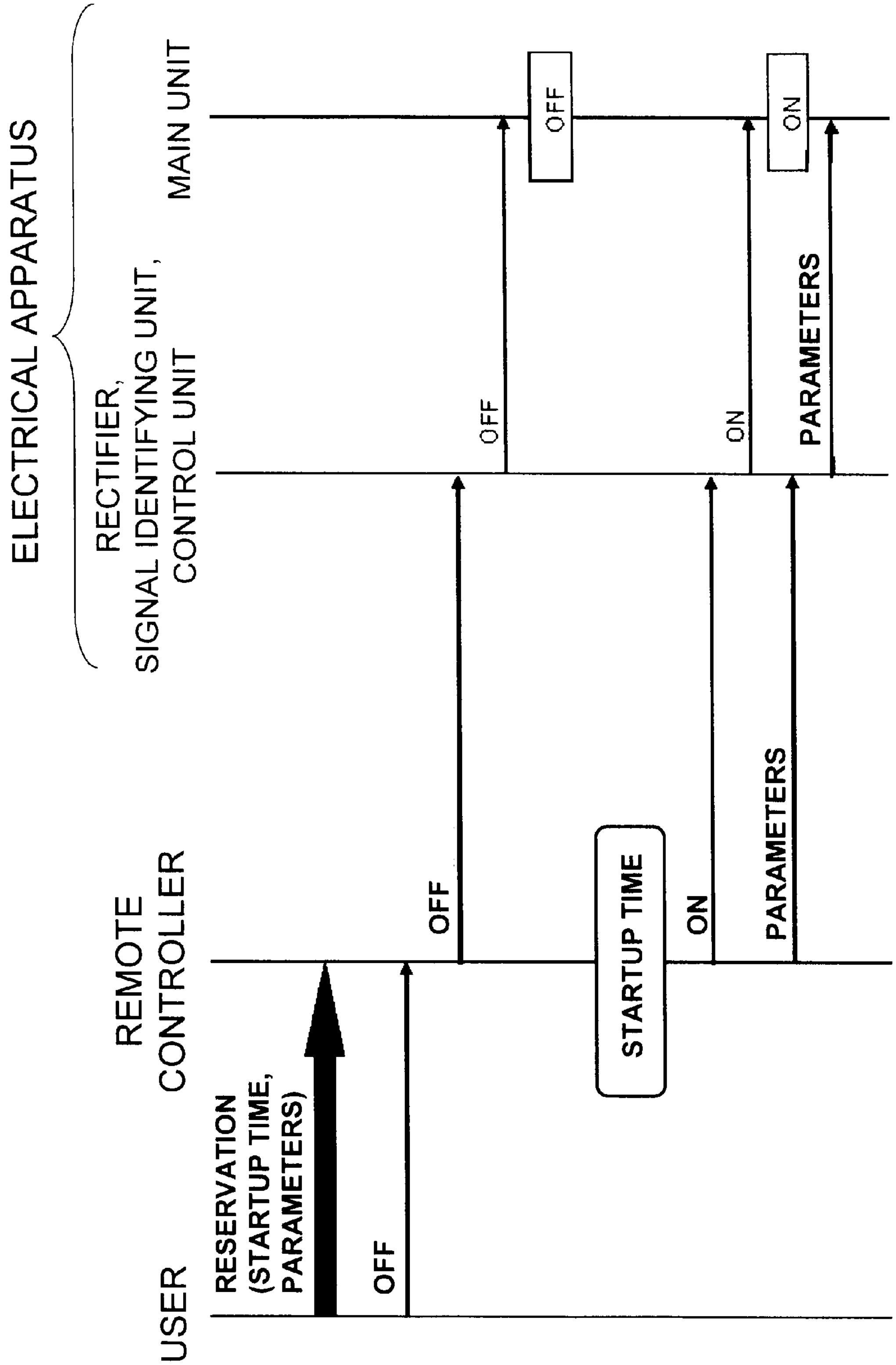
FIG. 4 is a sequence chart showing another example of an operation in the wireless controlling system 10.

Hereinafter, a modified example of the first embodiment will be described. While the electrical apparatus 130 in FIG. 1 includes the reservation memory unit 135 which memorizes the parameters for the operation, the electrical apparatus 130 may not include the reservation memory unit 135 in this example. As shown in FIG. 4, in this example, the remote controller 110 transmits the control packet indicating set of parameters after transmitting the control packet indicating startup ("ON"). Since the main unit 144 in the electrical apparatus 130 obtains the parameters from the control packet directly, the electrical apparatus 130 may not need the reservation memory unit 135.

Figure 5:
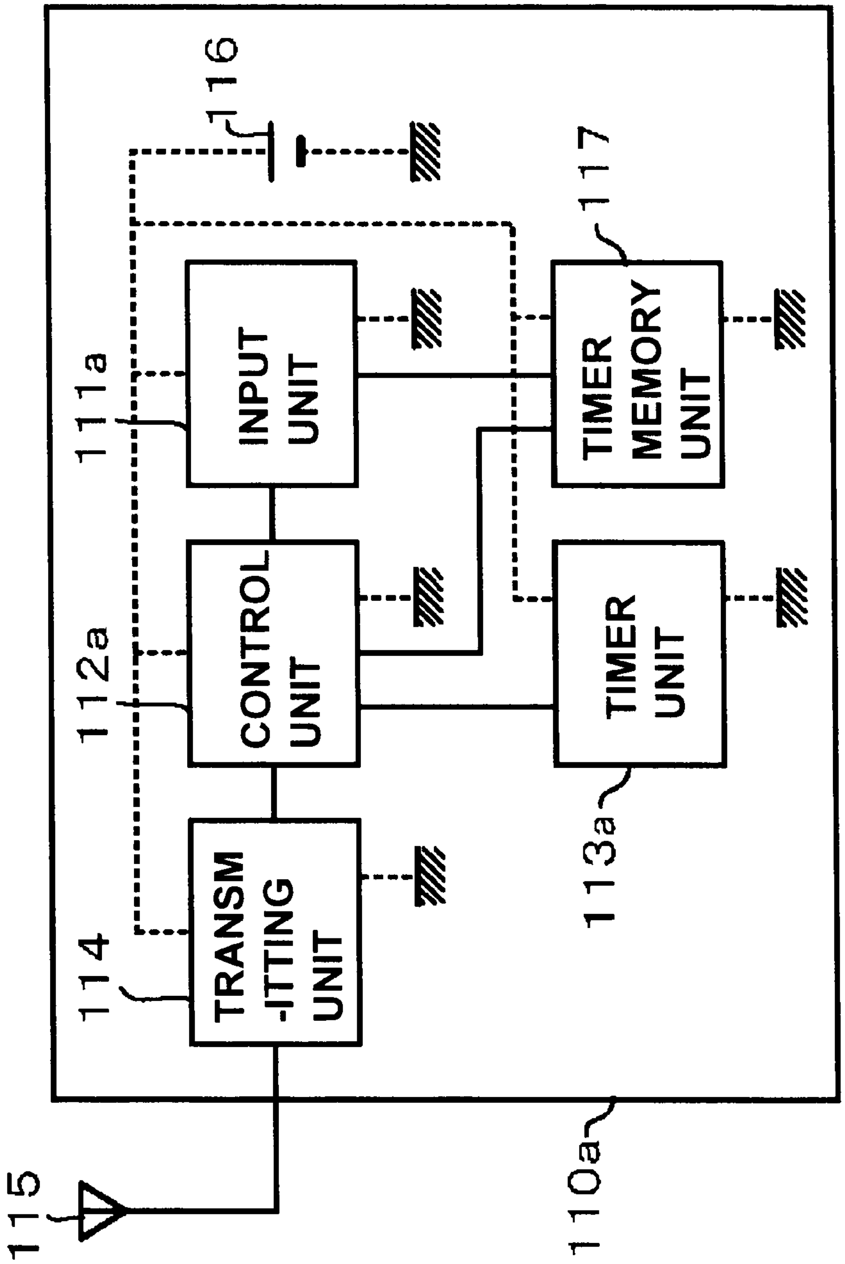
FIG. 5 is a block diagram showing a remote controller 110*a;*

Next, another modified example of the first embodiment will be described. In this example, a wireless controlling system 10*a* (not shown) includes a remote controller 110*a* and an electrical apparatus 130. The electrical apparatus 130 is same as FIG. 1. As shown in FIG. 5, the remote controller 110*a* includes an input unit 111*a*, a control unit 112*a*, a timer unit 113*a*, a transmitting unit 114, an antenna 115, a battery 116, and a timer memory unit 117.

An instruction is input into the input unit 111*a* from a user. The instruction is same as that described above. When the user tries to make a reservation to turn on the electrical apparatus 130 at a startup time, the instruction indicates making a reservation to turn on, with the startup time and other parameters for an operation of the electrical apparatus 130.

The startup time is set to the timer memory unit 117. The timer unit 113*a* counts clock time as a clock. The control unit 112*a* compares the clock time indicated from the timer unit 113*a* with the clock time memorized in the timer memory unit 117. When the clock time indicated from the timer unit 113*a* equals the clock time memorized in the timer memory unit 117, the control unit 112*a* generates a control packet indicating startup ("ON"). The transmitting unit 114 transmits the control packet to the electrical apparatus 130.

The control packet is transmitted from the antenna 115 as a radio wave. The battery 116 supplies electricity to the input unit 111*a*, the control unit 112*a*, the timer unit 113*a*, the transmitting unit 114, and the timer memory unit 117.

Other behaviors are same as the first embodiment. The wireless controlling system 10*a* with using the remote controller 110*a* can execute both sequences as shown in FIG. 3 and FIG. 4 and achieves same effect as the first embodiment.

Description of the Second Embodiment

Figure 6:
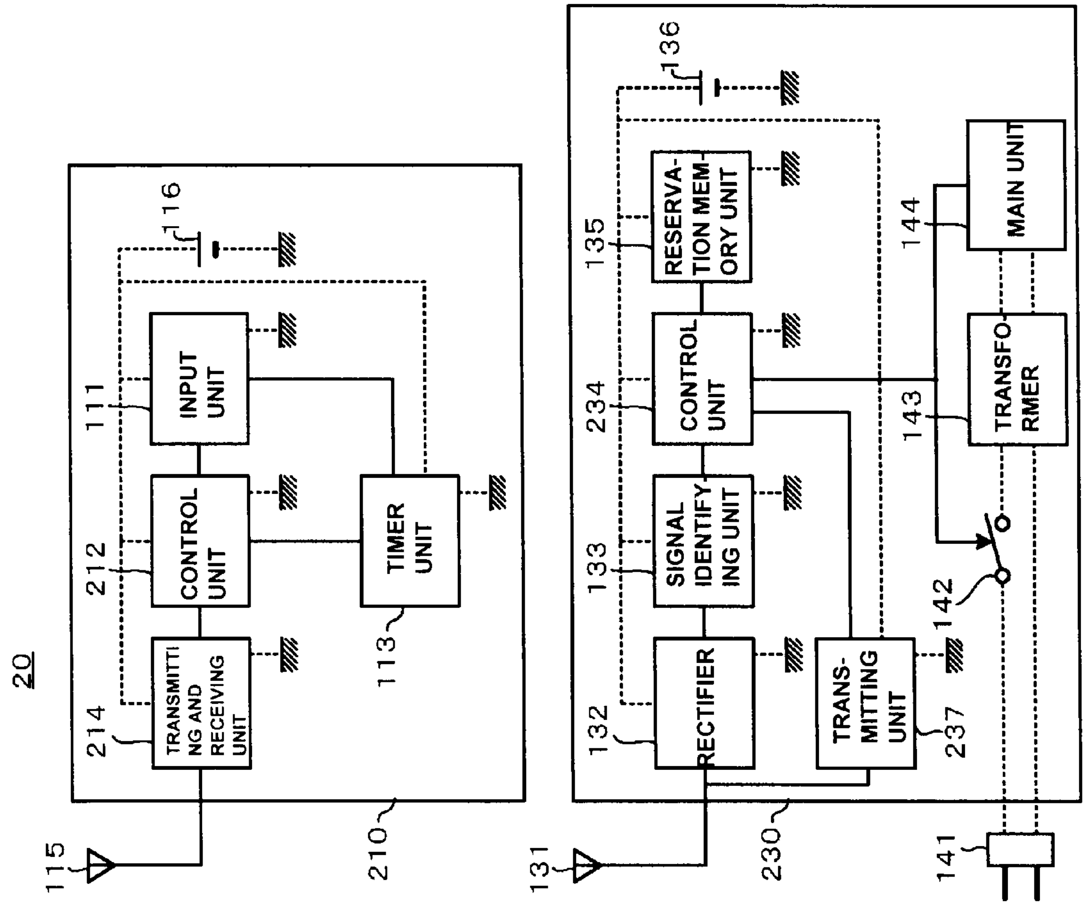
FIG. 6 is a block diagram showing a wireless controlling system 20 according to the second embodiment.

As shown in FIG. 6, a wireless controlling system 20 includes a remote controller 210 and an electrical apparatus 230. The electrical apparatus 230 is controlled by the remote controller 210 using a wireless medium. A user turns on/off the electrical apparatus 230 from the remote controller 210.

Moreover, the user makes a reservation with using the remote controller 210 to turn on/off the electrical apparatus 130 at a desired clock time. In the second embodiment, the electrical apparatus 230 is a recorder such as a DVD recorder and a TV with an internal HDD. In generally, the recorder such as a DVD recorder and a TV with an internal HDD can obtain an accurate clock time from a broadcasting center. Therefore, in the second embodiment, the electrical apparatus 230 calculates a time duration to be set to a timer of startup and indicates the time duration to the remote controller 210. As a result, the remote controller 210 in the second embodiment also obtains more a accurate timer compared with the remote controller 110 in the first embodiment.

The remote controller 210 includes an input unit 111, a control unit 212, a timer unit 113, a transmitting and receiving unit 214, an antenna 115, and a battery 116. The input unit 111, the timer unit 113, the antenna 115, and the battery 116 are the same as the first embodiment. Since the control unit 212 and the transmitting and receiving unit 214 are different from the first embodiment, they are described below.

The control unit 212 generates a control packet indicating startup ("ON"), when the instruction from the user indicates startup ("ON"). Similarly, the control unit 112 generates a control packet indicating halt ("OFF"), when the instruction from the user indicates halt ("OFF"). The control unit 212 also generates the control packet indicating halt ("OFF") when the instruction from the user indicates making a reservation to turn off and the timer unit 113 expires at the clock time to turn off. Moreover, the control unit 212 generates a control packet indicating parameters for an operation when the instruction from the user indicates making a reservation to turn on. The parameters may be a TV channel, a program, a start time of the program, an airtime, and an ending time. Then, the control unit 212 generates the control packet indicating startup ("ON"), when the timer unit 113 reaches the startup time. The transmitting and receiving unit 214 transmits the control packet to the electrical apparatus 230, when the transmitting and receiving unit 214 is indicated to send by the control unit 212. Moreover, the transmitting and receiving unit 214 receives a packet indicating a time duration until startup from the electrical apparatus 230. Then, the control unit 212 sets the time duration to the timer unit 113.

The electrical apparatus 230 includes an antenna 131, a rectifier 132, a signal identifying unit 133, a control unit 234, a reservation memory unit 135, a battery 136, a transmitting unit 237, a power plug 141, a switch 142 for supplying electricity to a main unit 144 from an external power source (not shown), a transformer 143 for adapting a voltage from the power plug 141, and a main unit 144.

The main unit 144 operates a main function of the electrical apparatus 230, for example, a cooling function in the case of the air-conditioner and a recording function in the case of the recorder such as a DVD recorder, a TV with an internal HDD. Moreover, the electrical apparatus 230 includes a clock unit (not shown). The antenna 131, the rectifier 132, the signal identifying unit 133, the reservation memory unit 135, the battery 136, the power plug 141, the switch 142, the transformer 143 and the main unit 144 are the same as the first embodiment. Since, the control unit 234, the transmitting unit 237, and the clock unit (not shown) are different from the first embodiment, they are described below. The clock unit (not shown) counts clock time as a clock based on the clock time obtained from a broadcasting center.

The control unit 234 controls supplying electricity from the external power source (not shown) to the main unit 144 by turning on/off the switch 142 according to the received control packet indicating the startup ("ON") or halt ("OFF"). After turning on the switch 142 to supply electricity to the main unit 144, the control unit 234 controls the main unit 144 according to the parameters which are memorized in the reservation memory unit 135.

Moreover, when the electrical apparatus 230 receives the control packet indicating parameters, the control unit 234 calculates a time duration until startup based on the current clock time counted in the clock unit (not shown) and the start time of the program indicated in the control packet from the remote controller 210. Then, the control unit 234 generates a packet indicating a time duration until startup (hereinafter "timer indication packet").

The transmitting unit 237 transmits the timer indication packet to the remote controller 210, when the transmitting unit 114 is indicated to send by the control unit 234.

(Operation in the Wireless Controlling System 20)

Figure 7:
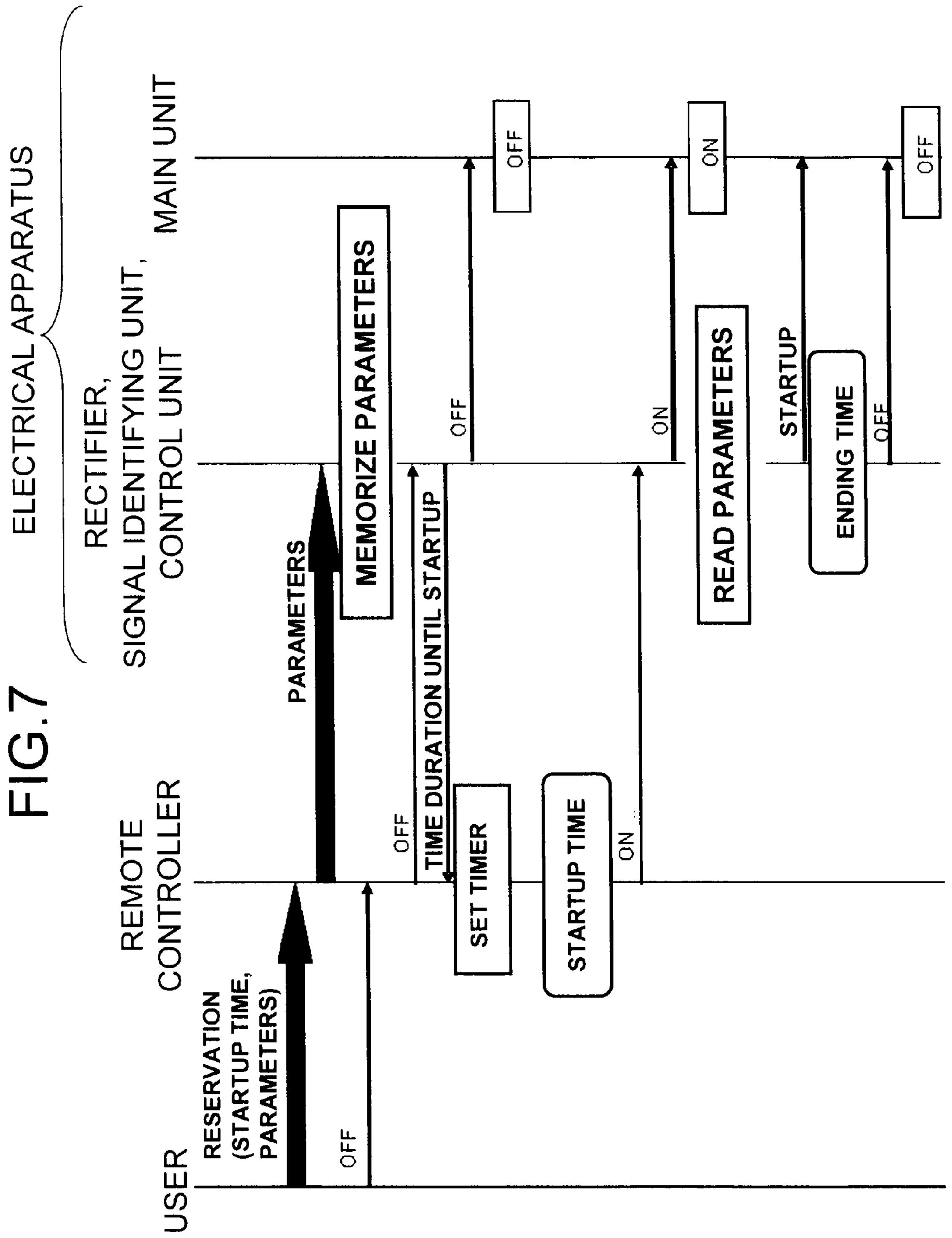
FIG. 7 is a sequence chart showing an example of an operation in the wireless controlling system 20.

Hereinafter, we explain an example of the operation in the wireless controlling system 20 with using FIG. 7. An example case is considered that a user makes a reservation to turn on the electrical apparatus 230 by using the remote controller 210. The electrical apparatus 230 may be the DVD recorder.

(1) Making a Reservation:

The user inputs an instruction indicating making the reservation to turn on, with the startup time and other parameters for an operation of the electrical apparatus 230 into the input unit 111. The parameters may be a TV channel, a program, a start time of the program, an airtime, and an ending time. The remote controller 210 transmits a control packet indicating the parameters for an operation to the electrical apparatus 230. The electrical apparatus 230 receives the control packet and memorizes the parameters for the operation in the reservation memory unit 135. Also, the electrical apparatus 230 calculates a time duration until startup based on the current clock time counted in the clock unit (not shown) and the start time of the program indicated in the control packet from the remote controller 210. Then, the control unit 234 generates the timer indication packet.

(2) Indicating the Time Duration until Startup from the Electrical Apparatus 230 to the Remote Controller 210:

Some users think making the reservation has finished by inputting the instruction indicating making the reservation to turn on. Therefore, these users may try to turn off the electrical apparatus 230 automatically to save energy, and input another instruction indicating halt ("OFF") to turn off the electrical apparatus 230 immediately, for example, by pushing a power button (not shown) on the remote controller 210. When the instruction from the user indicates halt ("OFF"), the remote controller 210 transmits the control packet indicating halt ("OFF") to the electrical apparatus 230 to turn off the electrical apparatus 230 immediately.

When the electrical apparatus 230 receives the control packet indicating halt ("OFF"), before turning off, the electrical apparatus 230 sends back the timer indication packet. The remote controller 210 receives the timer indication packet and sets the time duration to the timer unit 113. Then, in the electrical apparatus 230, the control packet indicating halt ("OFF") is sent to the control unit 234 as an "OFF" signal through the rectifier 132 and the signal identifying unit 133. When the control unit 234 receives the "OFF" signal, it turns off the switch 142 to stop supplying electricity from the external power source (not shown) to the main unit 144. Therefore, the other units except the main unit 144, that is the rectifier 132, the signal identifying unit 133, the control unit 234, the reservation memory unit 135, and the transmitting unit 237 are kept turned on to wait for receiving the control packet indicating startup ("ON") from the remote controller 210.

After turning off the electrical apparatus 230, the remote controller 210 manages the timer unit 113 to transmit the control packet so as to turn on the electrical apparatus 230 at the startup time.

(3) Managing the Timer 113 in the Remote Controller 210:

After turning off the electrical apparatus 230, the timer unit 113 in the remote controller 110 starts to count the time duration until startup of the electrical apparatus 230. When the timer unit 113 expires, the control unit 212 controls the transmitting and receiving unit 214 to transmit a control packet indicating startup ("ON").

The remote controller 210 just transmits only the control packet indicating startup ("ON"), since it has already transmitted the control packet indicating set of the parameters for an operation of the electrical apparatus 230. Since the electrical apparatus 230 has memorized the parameters used for the operation to be executed after startup in the reservation memory unit 135, the electrical apparatus 230 starts to operate without delay and errors due to transmission using the wireless medium.

(4) Startup the Electrical Apparatus 230:

After turning on the electrical apparatus 230, it executes operation based on the parameters memorized in the reservation memory unit 135.

According to the second embodiment, the remote controller 210 can obtain an accurate time duration from the electrical apparatus 230, because the electrical apparatus 230 has an accurate clock time from the broadcasting center. Therefore, the electrical apparatus 230 can start recording at more accurate clock time compared with the first embodiment.

Moreover, the wireless controlling system 20 achieves same effects as the wireless controlling system 20 in the first embodiment. That is, the wireless controlling system 20 reduces the consumption of standby electricity compared with a wireless controlling system which the electrical apparatus 230 has the timer for startup by turning off the main unit 144 in the electrical apparatus 230.

Moreover, since the remote controller 210 does not need to use the transformer, managing the timer for startup by the remote controller 210 does not cause increase of the consumption of standby electricity.

Hereinafter, a modified example of the second embodiment will be described. While the electrical apparatus 230 in FIG. 6 includes the reservation memory unit 135 which memorizes the parameters for the operation, the electrical apparatus 230 may not include the reservation memory unit 135 in this example. In this example, the remote controller 210 transmits the control packet indicating parameters after transmitting the control packet indicating startup ("ON"). Since the main unit 144 in the electrical apparatus 230 obtains the parameters from the control packet directly, the electrical apparatus 230 may not need the reservation memory unit 135.

Figure 8:
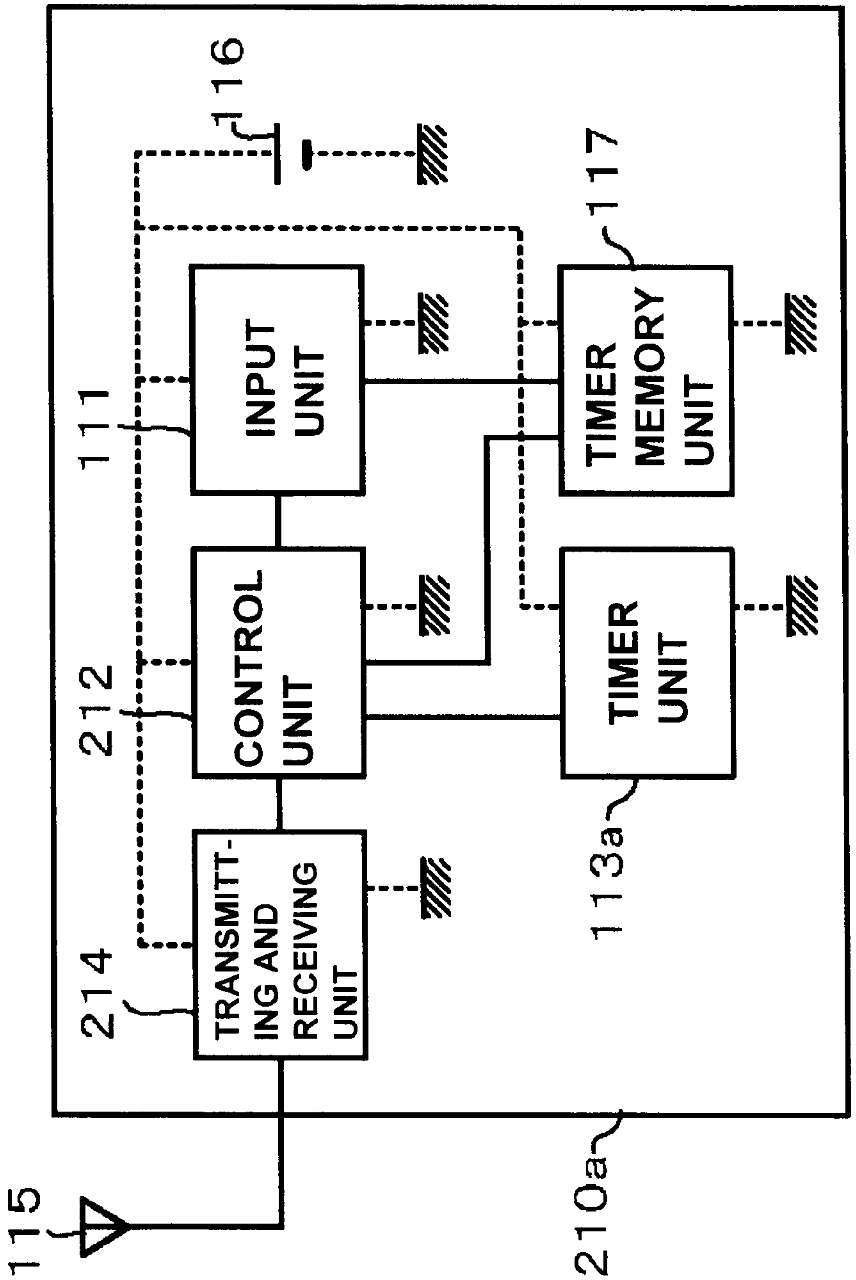
FIG. 8 is a block diagram showing a remote controller 210*a;*

Next, another modified example of the second embodiment will be described. In this example, a wireless controlling system 20*a* (not shown) includes a remote controller 210*a* and an electrical apparatus 230. The electrical apparatus 230 is same as FIG. 6. As shown in FIG. 8, the remote controller 210*a* includes an input unit 111, a control unit 212, a timer unit 113*a*, a transmitting and receiving unit 214, an antenna 115, a battery 116, and a timer memory unit 117.

Figure 9:
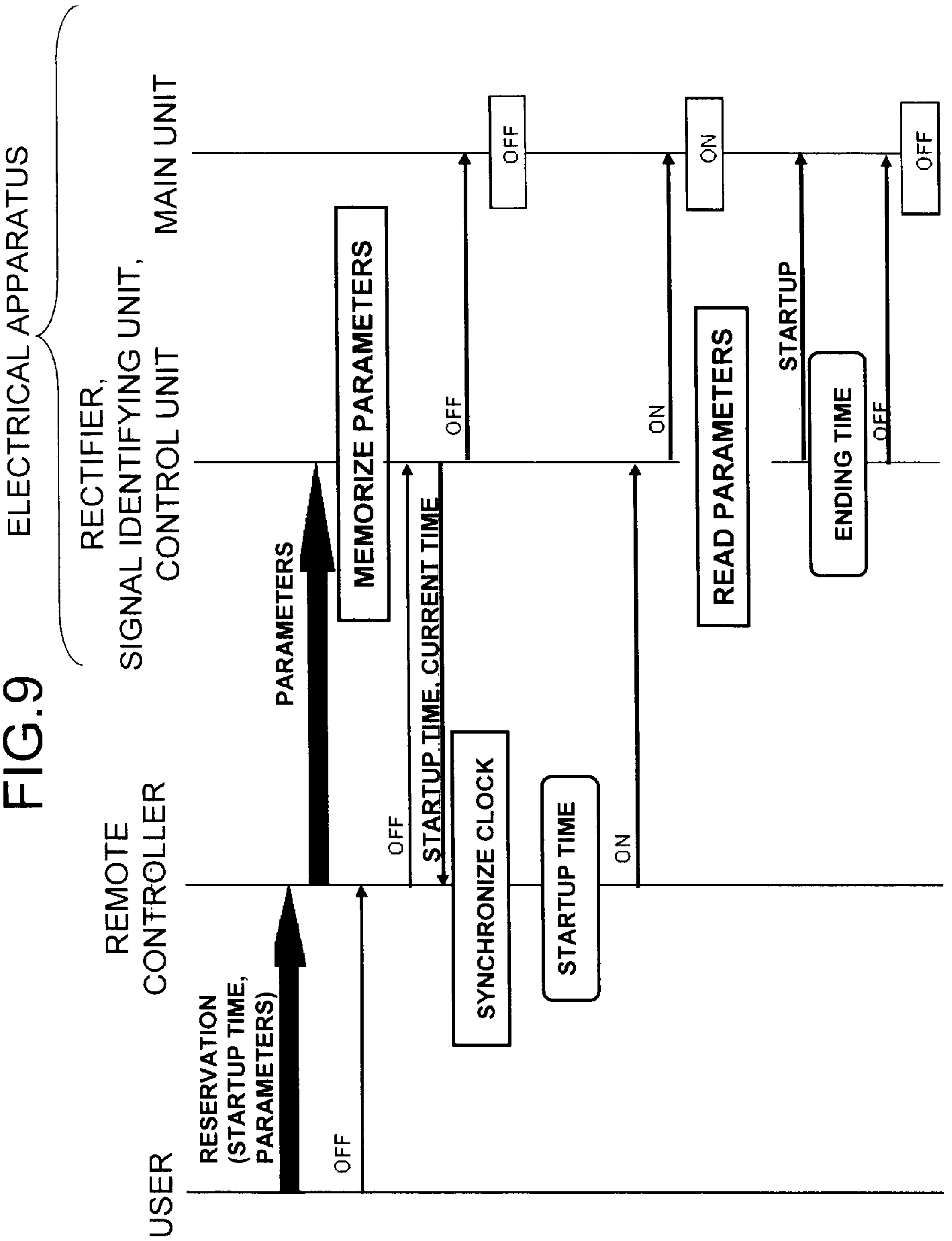
FIG. 9 is a sequence chart showing another example of an operation in the wireless controlling system 20.

As shown in FIG. 9, after the electrical apparatus 230 receives the control packet indicating halt ("OFF"), the electrical apparatus 230 transmits a packet indicating a startup time to the remote controller 210*a*. The remote controller 210*a* receives the packet and memorizes the startup time in the timer memory unit 117. The electrical apparatus 230 may transmit the packet without waiting for receiving the control packet indicating halt ("OFF"), when the electrical apparatus 230 receives the control packet indicating parameters. Moreover, the packet transmitted by electrical apparatus 230 may include a current clock time obtained from the clock unit (not shown) at the electrical apparatus 230 in addition to the startup time.

The remote controller 210*a* compares the clock time indicated from the timer unit 113*a* with the startup time memorized in the timer memory unit 117. When the clock time indicated from the timer unit 113*a* equals to the clock time memorized in the timer memory unit 117, the control unit 212 generates a control packet indicating startup ("ON"). The transmitting unit 214 transmits the control packet to the electrical apparatus 230. Moreover, the remote controller 210*a* synchronizes the clock time of timer unit 113*a* with the current clock time indicated from the electrical apparatus 230. Therefore, the remote controller 210*a* realizes a more accurate timer.

Description of the Third Embodiment

Figure 10:
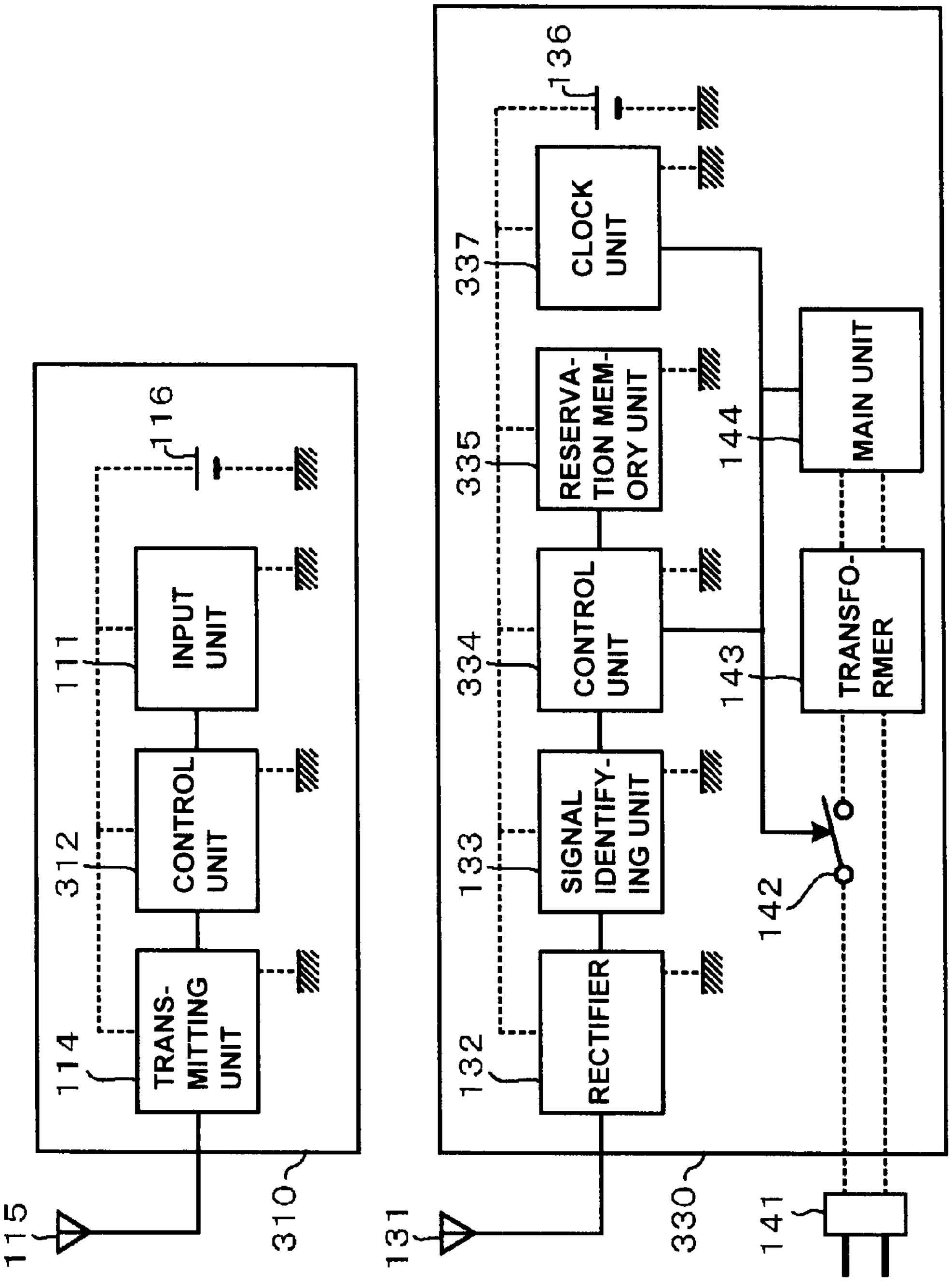
FIG. 10 is a block diagram showing a wireless controlling system 30 according to the third embodiment.

As shown in FIG. 10, a wireless controlling system 30 includes a remote controller 310 and an electrical apparatus 330. The electrical apparatus 330 is controlled by the remote controller 310 using a wireless medium. A user turns on/off the electrical apparatus 330 from the remote controller 310. Moreover, the user makes a reservation with using the remote controller 310 to turn on/off the electrical apparatus 330 at a clock time desired. In the third embodiment, the electrical apparatus 330 is a recorder such as a DVD recorder and a TV with an internal HDD. While the remote controller has a timer of startup in the first and second embodiments, the remote controller 310 does not have the timer of startup and the electrical apparatus 330 has the timer of startup in the third embodiment.

The remote controller 310 includes an input unit 111, a control unit 312, a transmitting unit 114, an antenna 115, and a battery 116. The input unit 111, the transmitting unit 114, the antenna 115, and the battery 116 are same as the first embodiment. Since the control unit 312 is different from the first embodiment, it is described below.

The control unit 312 generates a control packet indicating halt ("OFF"), when the instruction from the user indicates halt ("OFF"). The control unit 312 also generates a control packet indicating parameters for an operation when the instruction from the user indicates making a reservation to turn on. The parameters may be a TV channel, a program, a start time of the program (hereinafter, "startup time"), an airtime, and an ending time.

The electrical apparatus 330 includes an antenna 131, a rectifier 132, a signal identifying unit 133, a control unit 334, a reservation memory unit 335, a battery 136, a clock unit 337, a power plug 141, a switch 142 for supplying electricity to a main unit 144 from an external power source (not shown), a transformer 143 for adapting a voltage from the power plug 141, and a main unit 144. The main unit 144 operates a main function of the electrical apparatus 330, for example, a cooling function in the case of the air-conditioner and a recording function in the case of the recorder such as a DVD recorder, a TV with an internal HDD. The antenna 131, the rectifier 132, the signal identifying unit 133, the battery 136, the power plug 141, the switch 142, the transformer 143 and the main unit 144 are same as the first embodiment. Since, the control unit 334, the reservation memory unit 335, and the clock unit 337 are different from the first embodiment, they are described below.

The clock unit 337 counts clock time as a clock.

The control unit 334 controls supplying electricity from the external power source (not shown) to the main unit 144 by turning on/off the switch 142. The control unit 334 turns off the switch 142, when the electrical apparatus 330 receives the control packet indicating halt ("OFF"). The control unit 334 also turns off the switch 142, when the clock unit 337 reaches a time to turn off. On the other hand, the control unit 334 turns on the switch 142, when the clock unit 337 reaches the startup time. After turning on the switch 142 to supply electricity to the main unit 144, the control unit 334 controls the main unit 144 according to the parameters which are memorized in the reservation memory unit 335.

Moreover, the control unit 334 may periodically turn on/off the switch 142 to charge the battery 136 from the external power source (not shown) according to a time cycle to charge the battery 136 (hereinafter, "charge cycle of the battery 136"). The charge cycle of the battery 136 may be memorized in the reservation memory unit 335.

(Operation in the Wireless Controlling System 30)

Figure 11:
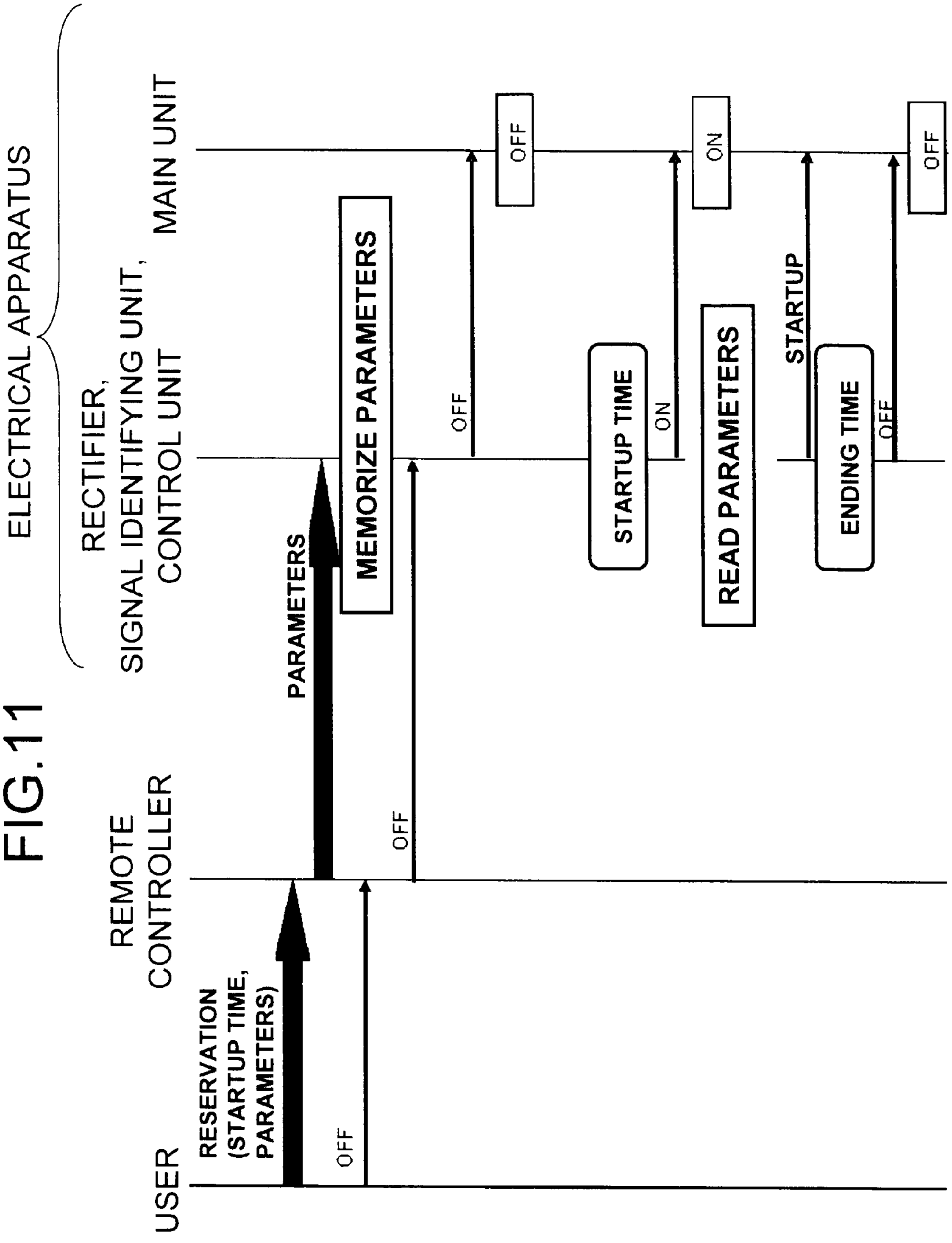
FIG. 11 is a sequence chart showing an example of an operation in the wireless controlling system 30.

Hereinafter, we explain an example of the operation in the wireless controlling system 30 with using FIG. 11. An example case is considered that a user makes a reservation to turn on the electrical apparatus 330 by using the remote controller 310. The electrical apparatus 330 may be the DVD recorder.

(1) Making a Reservation:

The user inputs an instruction indicating making the reservation to turn on, with the startup time and other parameters for an operation of the electrical apparatus 330 into the input unit 111. The parameters may be a TV channel, a program, a start time of the program, an airtime, and an ending time. The remote controller 310 transmits a control packet indicating the parameters for an operation to the electrical apparatus 330. The electrical apparatus 330 receives the control packet and memorizes the parameters for the operation in the reservation memory unit 335.

Some users think making the reservation has finished by inputting the instruction indicating making the reservation to turn on. Therefore, these users may try to turn off the electrical apparatus 330 automatically to save energy, and input another instruction indicating halt ("OFF") to turn off the electrical apparatus 330 immediately, for example, by pushing a power button (not shown) on the remote controller 310. When the instruction from the user indicates halt ("OFF"), the remote controller 310 transmits the control packet indicating halt ("OFF") to the electrical apparatus 330 to turn off the electrical apparatus 330 immediately. The electrical apparatus 330 receives the control packet indicating halt ("OFF"). The control packet indicating halt ("OFF") is sent to the control unit 334 as an "OFF" signal through the rectifier 132 and the signal identifying unit 133. When the control unit 334 receives the "OFF" signal, it turns off the switch 142 to stop supplying electricity from the external power source (not shown) to the main unit 144. Therefore, the other units except the main unit 144, that is the rectifier 132, the signal identifying unit 133, the control unit 334, the reservation memory unit 335, and the clock unit 337, keep turning on in order to count the clock time and wake up the main unit 144 at the startup time.

(2) Managing the Timer in the Electrical Apparatus 330:

After turning off the main unit 144, the control unit 334 compares the clock time indicated from the clock unit 337 with the startup time memorized in the reservation memory unit 335. When the clock time indicated from the clock unit 337 equals to the startup time memorized in the reservation memory unit 335, the control unit 334 turns on the switch 142 to start supplying electricity from the external power source (not shown) to the main unit 144. Then, the control unit 334 reads the parameters for the operation from the reservation memory unit 335 and indicates the parameters to the main unit 144. As a result, the main unit 144 starts to operate the recording function.

When the switch 142 is turned on, the battery 136 may also be charged from the external power source (not shown) in the case of the secondary battery.

Moreover, after turning on the main unit 144, the control unit 334 may compare the clock time indicated from the clock unit 337 with the ending time memorized in the reservation memory unit 335. When the clock time indicated from the clock unit 337 equals the ending time memorized in the reservation memory unit 335, the control unit 334 turns off the switch 142 to stop supplying electricity from the external power source (not shown) to the main unit 144. Then, the main unit 144 finishes the recording function.

The clock unit 337 may also be used as a timer to charge the battery 136 from the external power source (not shown) in the case of the secondary battery. For example, the charge cycle of the battery 136 is set into the clock unit 337. When the clock unit 337 expires, the control unit 334 turns on the switch 142 to charge the battery 136 from the external power source (not shown). The charge cycle of the battery 136 may be memorized in the reservation memory unit 335.

According to the third embodiment, in the wireless controlling system 30, the electrical apparatus 330 can turn off the main unit 144 after making a reservation for startup, because the control unit 334, the reservation memory unit 335, and the clock unit 337 in the electrical apparatus 330, which are used for managing the timer to turn on the main unit 144 at a desired time, are always active by being supplied electricity from the battery 136 even while the switch 142 is turned off. Therefore, the wireless controlling system 30 reduces the consumption of standby electricity by turning off the main unit 144.

Moreover, since the control unit 334, the reservation memory unit 335, and the clock unit 337 in the electrical apparatus 330 do not use the transformer 143, keeping them active does not cause increase of the consumption of standby electricity.

Moreover, the battery 136 is charged periodically by turning on/off the switch 142 according to the charge cycle of the battery 136. Therefore, since the battery 136 does not run down, the control unit 334, the reservation memory unit 335, and the clock unit 337 in the electrical apparatus 330 can keep active.

Description of the Fourth Embodiment

Figure 12:
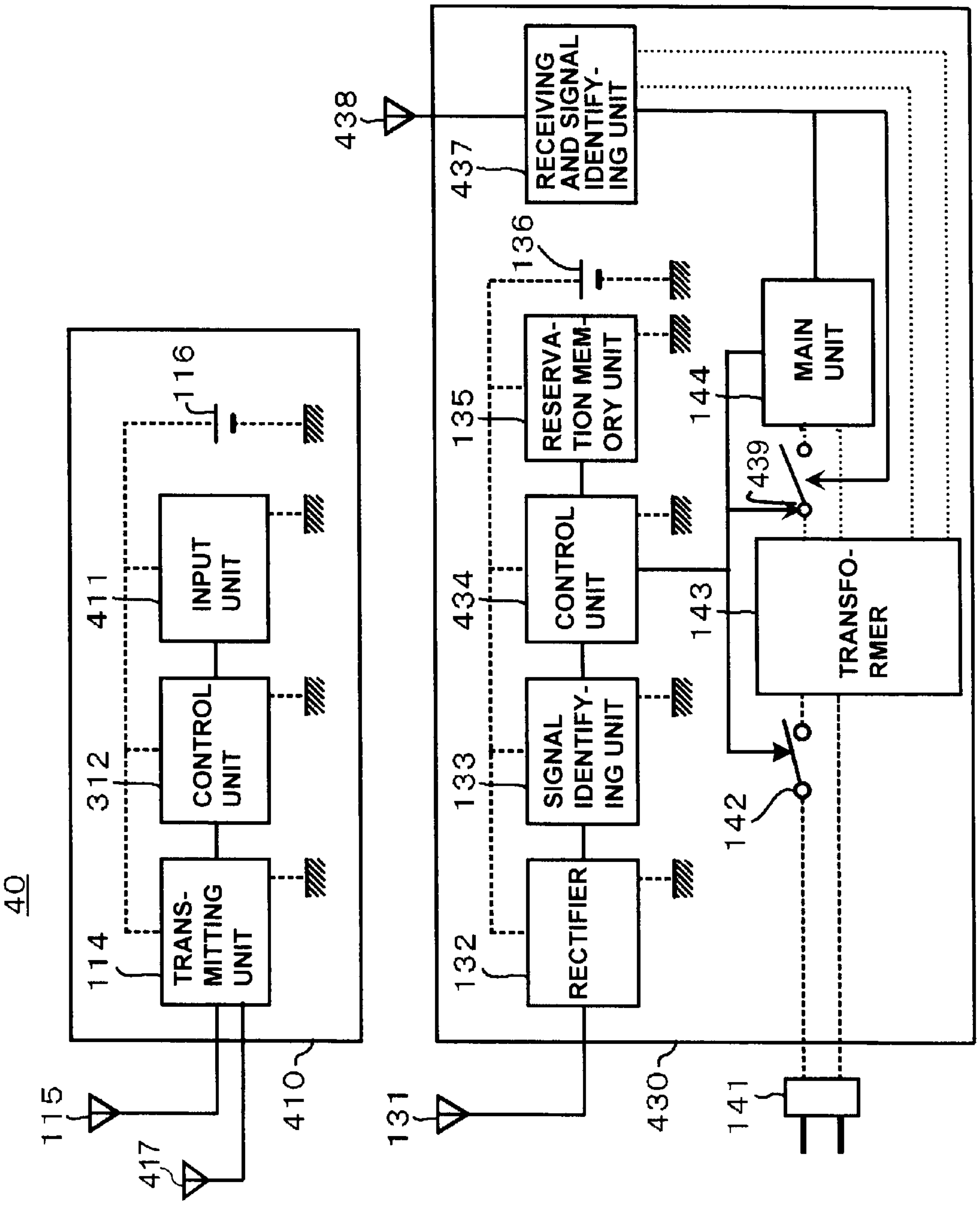
FIG. 12 is a block diagram showing a wireless controlling system 40 according to the fourth embodiment.

As shown in FIG. 12, a wireless controlling system 40 includes a remote controller 410 and an electrical apparatus 430. In the fourth embodiment, the electrical apparatus 430 is a recorder such as a DVD recorder and a TV with an internal HDD. The wireless controlling system 40 uses two kinds of wireless medium, that is a first wireless medium and a second wireless medium. The first and second mediums may be two of micrometer wave, millimeter wave and infrared ray. The electrical apparatus 430 is controlled by the remote controller 410 using the first wireless medium and the second wireless medium. The electrical apparatus 430 may have more than two functions, for example, showing video on the display and recording a TV program into the HDD in the case of the TV with an internal HDD. In this case, the first wireless medium may be used to start/stop all functions (this means turning on/off the electrical apparatus 430), and the second wireless medium may be used to control each function. Moreover, the remote controller 410 has two power buttons, one is a main power button (not shown) and the other is a common power button (not shown). A user pushes the main power button, when the user tries to turn off the electrical apparatus 430 to stop all functions except receiving a signal using the first wireless medium. The user also pushes the main power button, when the user tries to turn on the electrical apparatus 430 which has stopped all functions by having pushed the main power button. When the main power button is pushed, the remote controller 410 transmits a control packet indicating startup ("ON") or halt (OFF") to the electrical apparatus 430 with using the first wireless medium.

On the other hand, the user pushes the common power button, when the user tries to stop a certain function such as showing a TV program on the display. The user also pushes the common power button, when the user tries to start the certain function. When the common power button is pushed, the remote controller 410 transmits a control packet indicating startup ("ON") or halt (OFF") to the electrical apparatus 430 with using the second wireless medium. Moreover, the user makes a reservation from the remote controller 410 with using the second wireless medium to turn on/off the electrical apparatus 430 at a clock time desired. Since the procedure to make a reservation is same as the third embodiment except using the second wireless medium for making a reservation, the description is skipped. Other operations, which the main and common power buttons are pushed, are described below.

The remote controller 410 includes an input unit 411, a control unit 312, a transmitting unit 114, an antenna 115 for the first wireless medium, an antenna 417 for the second wireless medium, and a battery 116. The input unit 411 is connected to two power buttons (not shown), that is the main power button and the common power button. When the user pushes the main power button, an instruction indicating startup ("ON") or halt ("OFF") is input into the input unit 411 with a parameter which shows "the main power button". When the user pushes the common power button, the instruction indicating startup ("ON") or halt ("OFF") is input into the input unit 411 with the parameter which shows "the common power button". The control unit 312 generates a control packet indicating startup ("ON"), when the instruction from the user indicates startup ("ON") despite the parameter showing "the main power button" or "the common power button". Similarly, the control unit 312 generates a control packet indicating halt ("OFF"), when the instruction from the user indicates halt ("OFF") despite the parameter showing "the main power button" or "the common power button". Then, the control unit 312 inputs the control packet into the transmitting unit 114 with the parameter showing "the main power button" or "the common power button".

When the parameter is "the main power button", the transmitting unit 114 transmits the control packet from the antenna 115 using the first wireless medium to the electrical apparatus 430. When the parameter is "the common power button", the transmitting unit 114 transmits the control packet from the antenna 417 using the second wireless medium to the electrical apparatus 430.

The electrical apparatus 430 includes an antenna 131 for the first wireless medium, a rectifier 132, a signal identifying unit 133, a control unit 434, a reservation memory unit 135, a battery 136, a receiving and signal identifying unit 437, an antenna 438 for the second wireless medium, a power plug 141, a switch 142 for supplying electricity to a main unit 144 and a receiving and signal identifying unit 437 from an external power source (not shown), a switch 439 for supplying electricity only to a main unit 144, a transformer 143 for adapting a voltage from the power plug 141, and a main unit 144. The main unit 144 operates main functions of the electrical apparatus 430, for example, a recording function and a displaying function in the case of the TV with an internal HDD. Moreover, the electrical apparatus 430 includes a clock unit (not shown). The clock unit counts clock time as a clock.

The antenna 131 receives the control packet using the first wireless medium from the remote controller 410. When the control packet is received at the antenna 131, the rectifier 132, the signal identifying unit 133, the reservation memory unit 135, the battery 136, the power plug 141, the switch 142, the transformer 143, the main unit 144, and the clock unit (not shown) work as same as the third embodiment. Only the control unit 434 is different from the third embodiment.

The control unit 434 controls the switch 142 to supply electricity such as an AC power to the transformer 143 from the external power source (not shown) through the plug 141. The transformer 143 transforms the electricity into a DC power which is suitable to the main unit 144. The control unit 434 also controls the switch 439 according to the control packet received through the first wireless medium, which indicating the startup ("ON") or halt ("OFF"). When the control unit 434 receives the control packet indicating startup ("ON"), both of switches 142 and 439 are simultaneously turned on by the control unit 434. When the control unit 434 receives the control packet indicating halt ("OFF"), the switch 142 is turned off in the case that the electrical apparatus 430 has a reservation, or only the switch 439 is turned off in the case that the electrical apparatus 430 has no reservation. When the switch 142 is turned off, the 439 may be turned off together. During turning on the switches 142, 439 to supply electricity to the main unit 144 and the receiving and signal identifying unit 437, the control unit 434 controls the main unit 144 to perform main functions.

The antenna 438 receives the control packet using the second wireless medium from the remote controller 410.

When the control packet is received at the antenna 438 using the second wireless medium, the receiving and signal identifying unit 437 identifies the control packet which indicates startup ("ON") or halt ("OFF"), or parameters for an operation. The parameters may be a TV channel, a program, a start time of the program (hereinafter, "startup time"), an airtime, and an ending time.

When the switch 142 is turned on, the receiving and signal identifying unit 437 controls supplying electricity from the external power source (not shown) to the main unit 144 by turning on/off the switch 439 according to the control packet received using the second wireless medium, which indicating the startup ("ON") or halt ("OFF"). Moreover, when the received packet indicates the parameters for the operation, the receiving and signal identifying unit 437 controls the main unit 144 to make a reservation.

(Operation in the Wireless Controlling System 40)

Hereinafter, we explain an example of the operation in the wireless controlling system 40. An example case is considered that a user pushes the main power button and the common power button after making a reservation to turn on the electrical apparatus 430. The electrical apparatus 430 may be a TV with an internal HDD.

(1) Making a Reservation:

The user inputs an instruction indicating making the reservation to turn on, with the startup time and other parameters for an operation of the electrical apparatus 430 into the input unit 411. The parameters may be a TV channel, a program, a start time of the program, an airtime, and an ending time. The remote controller 410 transmits the control packet indicating the parameters for an operation to the electrical apparatus 430 using the second wireless medium.

The electrical apparatus 430 receives the control packet indicating the parameters for an operation. The receiving and signal identifying unit 437 in the electrical apparatus 430 receives the control packet from the antenna 438 and obtains the parameters from the control packet. Then, the parameters are input into the main unit 144. The main unit 144 forwards the parameters to the control unit 434, and the control unit 434 memorizes the parameters in the reservation memory unit 135.

(2) Pushing the Common Power Button for Halt ("OFF")

When the user pushes the common power button, for example, to stop showing a TV program on the display, the remote controller 410 transmits the control packet indicating halt ("OFF") from the antenna 417 using the second wireless medium. The electrical apparatus 430 receives the control packet indicating halt ("OFF") at the antenna 438. When the received control packet indicates halt ("OFF"), the receiving and signal identifying unit 437 in the electrical apparatus 430 turns off the switch 439 to stop supplying electricity to the main unit 144 from the external power source (not shown). Therefore, the receiving and signal identifying unit 437 is kept turned on to wait for receiving the control packet indicating startup ("ON") using the second wireless medium from the remote controller 410, for example, in order to start showing a TV program on the display. Moreover, the rectifier 132, the signal identifying unit 133, the control unit 434, and the reservation memory unit 135 are kept turned on to wait for receiving the control packet indicating halt ("OFF") using the first wireless medium from the remote controller 410, in order to stop all functions (this means turning off the electrical apparatus 430). Moreover, the clock unit (not shown) is kept turned on in order to count the clock time and wake up the main unit 144 at the startup time.

(3) Pushing the Main Power Button for Halt ("OFF")

Figure 13:
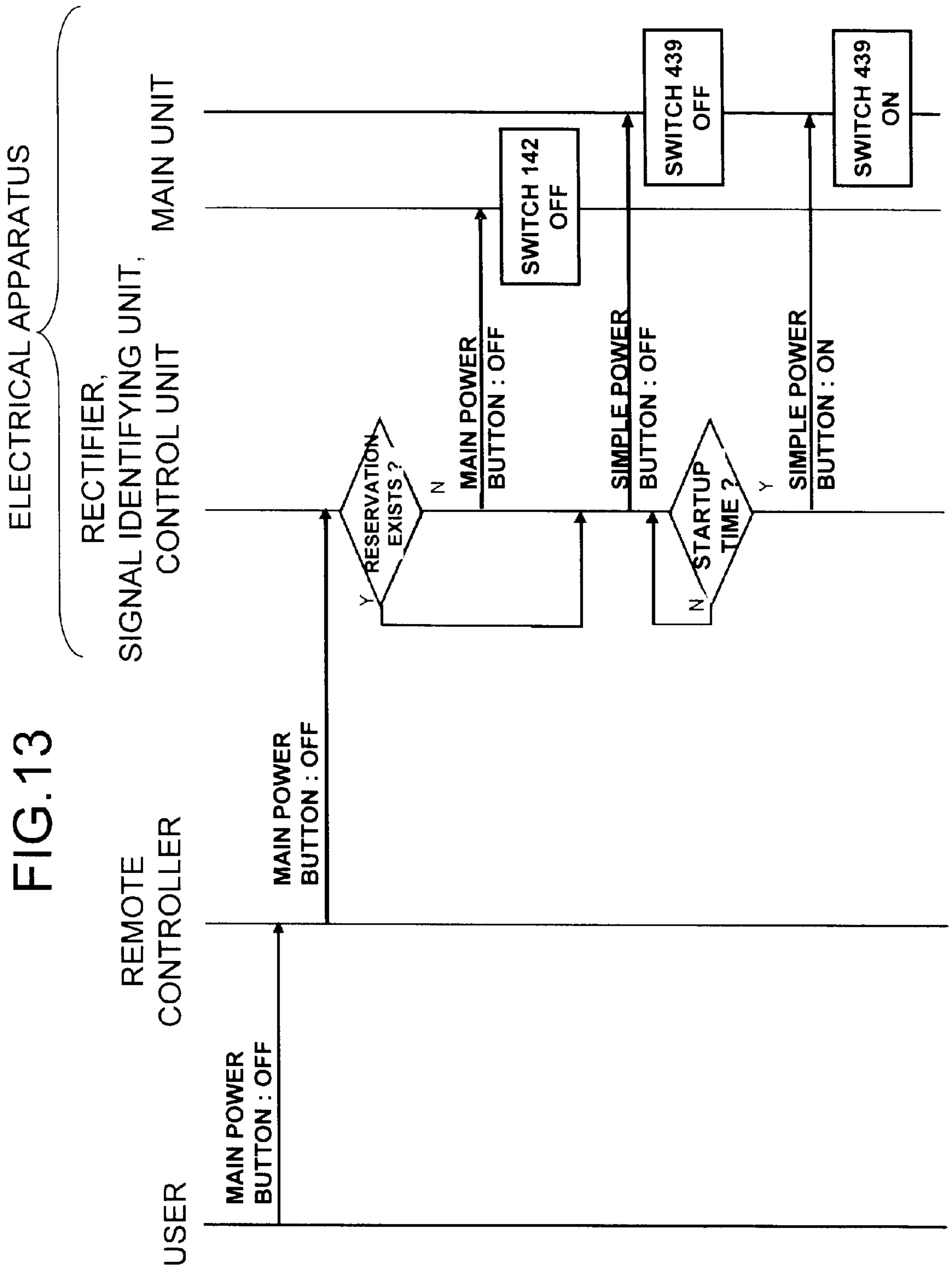
FIG. 13 is a sequence chart showing an example of an operation in the wireless controlling system 40.

As shown in FIG. 13, when the user pushes the main power button, the remote controller 410 transmits the control packet indicating halt ("OFF") from the antenna 115 using the first wireless medium. The electrical apparatus 430 receives the control packet indicating halt ("OFF") from the antenna 131. The control packet indicating halt ("OFF") is gotten to the control unit 434 as an "OFF" signal through the rectifier 132 and the signal identifying unit 133. When the control unit 434 receives the "OFF" signal, it checks whether a reservation to turn on/off exits or not in the reservation memory unit 135.

When no reservation exists in the reservation memory unit 135, the control unit 434 turns off the switch 142 to stop supplying electricity from the external power source (not shown) to the main unit 144 and the receiving and signal identifying unit 437. The control unit 434 may turn off the switch 439 in addition to the switch 142. Since the main unit 144 and the receiving and signal identifying unit 437 are turned off by the main power button while only main unit 144 is turned off by the common power button, pushing the main power button on the remote control 410 leads to reducing the consumption of standby electricity more than the pushing the common power button.

On the other hand, when a reservation exists in the reservation memory unit 135, the control unit 434 turns off only the switch 439 and keeps the switch 142 turned on. Since the receiving and signal identifying unit 437 keeps turning on, the remote controller 410 can control the electrical apparatus 430 using the second wireless medium in order to, for example, confirm the reservation or update the reservation. Moreover, the clock unit (not shown) is kept turned on in order to count the clock time and wake up the main unit 144 at the startup time.

According to the fourth embodiment, in the wireless controlling system 40, the electrical apparatus 430 can turn off the main unit 144 after making a reservation for startup as same as the third embodiment. Therefore, the wireless controlling system 40 reduces the consumption of standby electricity.

Even if the wireless controlling system 40 uses two kinds of wireless mediums between the remote controller 410 and the electrical apparatus 430, the electrical apparatus 430 can reduce the consumption of standby electricity by turning off the main unit 144 using the switches 142, 439. Especially, since the electrical apparatus 430 does not use the transformer 143 when the main power button is pushed, the turning off by the main power button reduces the consumption of standby electricity more than that by the common power button.

Moreover, the electrical apparatus 430 controls the switches 142, 439 according to the existence of a reservation, when the main power button is pushed. Therefore, the user can turn off the electrical apparatus 430 without needing to care whether the user has made a reservation or not.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote controller for controlling an electrical apparatus to turn on at a startup time comprising:

an input unit into which the startup time or a first time duration until the startup time is input;

a timer unit which counts either a clock time or a second time duration;

a control unit which generates a first signal to turn on the electrical apparatus when the second time duration counted by the timer unit reaches the first time duration, or when the clock time counted by the timer unit equals to the startup time;

a transmitting unit which transmits the first signal to the electrical apparatus; and a receiving unit which receives a second signal from the electrical apparatus indicating a third time duration until the startup time;

wherein the transmitting unit transmits a third signal indicating the startup time to the electrical apparatus;

the receiving unit receives the second signal after transmitting the third signal; and the control unit generates the first signal by using the third time duration instead of the first time duration when the receiving unit receives the second signal.

2. The remote controller of claim 1, further comprising:

a memory unit which stores the startup time;

wherein the startup time is input into the input unit and stored in the memory unit;

the timer unit counts the clock time; and the control unit generates the first signal to turn on the electrical apparatus when the clock time counted by the timer unit equals the startup time stored in the memory unit.

3. The remote controller of claim 2, further comprising:

the receiving unit receives a fourth signal indicating an accurate clock time which is a clock time counted by the electrical apparatus;

wherein the receiving unit receives the fourth signal from the electrical apparatus after transmitting the third signal; and the control unit synchronizes the clock time of the timer unit with the accurate clock time indicated from the electrical apparatus.

4. An electrical apparatus which is controlled by a reservation to turn on at a startup time made by a remote controller, comprising:

a main unit which operates a main function;

a transformer which transforms electricity from an external power source for the main unit;

a first switch which supplies the electricity from the external power source to the transformer;

a rectifier which rectifies a first signal indicating one of startup, halt, or a parameter for operation of the main function, the first signal being transmitted from the remote controller using a first wireless medium;

a signal identifying unit which identifies the first signal;

a reservation memory unit which stores the parameter for the reservation made by the remote controller;

a control unit which stores the parameter into the reservation memory unit when the first signal indicating the parameter is received, turns on the first switch and controls the main unit according to the parameter stored in the reservation memory unit when the first signal indicating startup is received, and turns off the first switch when the first signal indicating halt is received; and a battery which supplies electricity to the rectifier, the signal identifying unit, the reservation memory unit, and the control unit.

5. The electrical apparatus of claim 4, further comprising:

a clock unit which counts an accurate clock time; and a transmitting unit which transmits a second signal indicating the accurate clock time, after receiving the first signal indicating the parameter from the remote controller, the accurate clock time being used to synchronize a clock time at the remote controller.

6. The electrical apparatus of claim 4, further comprising:

a clock unit which counts a clock time; and a transmitting unit which transmits a second signal to the remote controller after receiving the first signal, wherein the control unit calculates the time duration based on the clock time counted in the clock unit and a startup time associated with the first signal indicating startup, and generates the second signal including the time duration.

7. The electrical apparatus of claim 4, further comprising:

a clock unit which counts a clock time, wherein the parameter in the first signal includes the startup time;

the control unit turns on the first switch when the clock time counted in the clock unit equals the startup time stored in the reservation memory unit; and the battery supplies electricity to the clock unit.

8. The electrical apparatus of claim 7, wherein the control unit periodically turns on the first switch to charge the battery from the external power source in a time cycle stored in the reservation memory unit.

9. The electrical apparatus of claim 7, further comprising:

a receiving and signal identifying unit which receives and identifies the first signal; and a second switch which supplies the electricity from the transformer to the main unit, wherein the first signal is transmitted from the remote controller using the first wireless medium or a second wireless medium which is different from the first wireless medium;

the signal identifying unit receives the first signal using the first wireless medium;

the signal identifying unit identifies the first signal using the first wireless medium;

the receiving and signal identifying unit receives and identifies the first signal using the second wireless medium;

the control unit turns on the first and second switches when the first signal indicating startup is received using the first wireless medium, turns off the second switch when the first signal indicating halt is received using the first wireless medium and the reservation to turn on exists in the reservation memory unit, and turns off the first switch when the first signal indicating halt using the first medium and no reservation exists in the reservation memory unit; and the receiving and signal identifying unit turns on the second switch when the first signal indicating startup is received using the second wireless medium, and turns off the second switch when the first signal indicating halt is received using the second wireless medium.

10. A wireless controlling system which a remote controller controls an electrical apparatus to turn on at a startup time, comprising:

the remote controller including:

an input unit which the startup time or a first time duration until the startup time is input;

a timer unit which counts either a clock time or a second time duration;

a first control unit which generates a first signal to turn on the electrical apparatus when the second time duration counted by the timer unit reaches the first time duration, or when the clock time counted by the timer unit equals to the startup time; and a transmitting unit which transmits the first signal to the electrical apparatus, and the electrical apparatus including:

a main unit which operates a main function;

a transformer which transforms electricity from an external power source for the main unit;

a switch which supplies the electricity from the external power source to the transformer;

a rectifier which rectifies the first signal;

a signal identifying unit which identifies the first signal;

a reservation memory unit which keeps a parameter for the main function;

a second control unit which turns on the switch and controls the main unit according to the parameter memorized in the reservation memory unit when the first signal is received; and a battery which supplies electricity to the rectifier, the signal identifying unit, the reservation memory unit, and the second control unit.

11. The wireless controlling system of claim 10, wherein, the remote controller further includes a memory unit which stores the startup time, wherein, in the remote controller, the startup time is input into the input unit and stored in the memory unit;

the timer unit counts the clock time; and the first control unit generates the first signal to turn on the electrical apparatus when the clock time counted by the timer unit equals the startup time stored in the memory unit.

12. The wireless controlling system of claim 10, wherein the remote controller further includes a receiving unit which receives a second signal from the electrical apparatus indicating a third time duration until the startup time, wherein, in the remote controller, the transmitting unit transmits a third signal indicating the startup time to the electrical apparatus;

the receiving unit receives the second signal after transmitting the third signal; and the first control unit generates the first signal by using the third time duration instead of the first time duration when the receiving unit receives the second signal, the electrical apparatus further includes a clock unit which counts a clock time; and a transmitting unit which transmits the second signal indicating the third time duration after receiving the third signal from the remote controller, wherein, in the electrical apparatus, the rectifier rectifies the third signal;

the signal identifying unit identifies the third signal;

the second control unit calculates the third time duration based on the clock time counted in the clock unit and the startup time in the third signal, and generates the second signal.

13. The wireless controlling system of claim 10, wherein the remote controller further includes a memory unit which stores the startup time; and a receiving unit which receives a second signal indicating an accurate clock time which is a clock time counted by the electrical apparatus, wherein, in the remote controller, the startup time is input into the input unit and stored in the memory unit;

the timer unit counts the clock time;

the first control unit generates the first signal to turn on the electrical apparatus when the clock time counted by the timer unit equals the startup time stored in the memory unit;

the transmitting unit transmits a third signal indicating the startup time to the electrical apparatus;

the receiving unit receives the second signal from the electrical apparatus after transmitting the third signal; and the control unit synchronizes the clock time of the timer unit with the accurate clock time in the second signal, the electrical apparatus further includes a clock unit which counts a clock time; and a transmitting unit which transmits the second signal indicating the accurate clock time, which is counted in the clock unit, after receiving the third signal.

14. The wireless controlling system of claim 10, wherein the electrical apparatus further includes a clock unit which counts a clock time, wherein, in the remote controller, the transmitting unit transmits a second signal indicating the startup time to the electrical apparatus, wherein, in the electrical apparatus, the rectifier rectifies the second signal;

the signal identifying unit identifies the second signal;

the second control unit turns on the switch when the clock time counted in the clock unit equals the startup time in the second signal; and the battery supplies electricity to the clock unit.

15. A remote controller for controlling an electrical apparatus to turn on at a startup time comprising:

an input unit into which the startup time or a first time duration until the startup time is input;

a timer unit which counts either a clock time or a second time duration;

a control unit which generates a first signal to turn on the electrical apparatus when the second time duration counted by the timer unit reaches the first time duration, or when the clock time counted by the timer unit equals to the startup time;

a transmitting unit which transmits the first signal to the electrical apparatus;

a memory unit which stores the startup time;

wherein the startup time is input into the input unit and stored in the memory unit;

the timer unit counts the clock time; and the control unit generates the first signal to turn on the electrical apparatus when the clock time counted by the timer unit equals the startup time stored in the memory unit; and a receiving unit which receives a second signal indicating an accurate clock time which is a clock time counted by the electrical apparatus;

wherein the transmitting unit transmits a third signal indicating the startup time to the electrical apparatus;

the receiving unit receives the second signal from the electrical apparatus after transmitting the third signal; and the control unit synchronizes the clock time of the timer unit with the accurate clock time indicated from the electrical apparatus.

* * * * *